United States Patent
Wagh et al.

(10) Patent No.: US 9,378,173 B2
(45) Date of Patent: *Jun. 28, 2016

(54) APPARATUS AND METHOD TO MAXIMIZE BUFFER UTILIZATION IN AN I/O CONTROLLER

(75) Inventors: Mahesh U. Wagh, Tacoma, WA (US); Wilfred W. Kwok, Markham, CA (US); Sridhar Muthrasanallur, Turnwater, WA (US)

(73) Assignee: Intel Corporation, Santa Clara, CA (US)

( * ) Notice: Subject to any disclaimer, the term of this patent is extended or adjusted under 35 U.S.C. 154(b) by 874 days.

This patent is subject to a terminal disclaimer.

(21) Appl. No.: 12/704,470

(22) Filed: Feb. 11, 2010

(65) Prior Publication Data

US 2010/0146162 A1   Jun. 10, 2010

Related U.S. Application Data

(60) Division of application No. 12/113,035, filed on Apr. 30, 2008, now Pat. No. 7,734,847, which is a continuation of application No. 10/815,347, filed on Mar. 31, 2004, now Pat. No. 7,441,055.

(51) Int. Cl.
*G06F 3/00* (2006.01)
*G06F 13/40* (2006.01)
*H04L 12/801* (2013.01)
*H04L 12/40* (2006.01)

(52) U.S. Cl.
CPC ........ *G06F 13/4059* (2013.01); *H04L 12/4013* (2013.01); *H04L 47/10* (2013.01)

(58) Field of Classification Search
None
See application file for complete search history.

(56) References Cited

U.S. PATENT DOCUMENTS

| | | | |
|---|---|---|---|
| 5,787,072 A | 7/1998 | Shimojo et al. | |
| 6,009,488 A | 12/1999 | Kavipurapu | |
| 6,240,095 B1 | 5/2001 | Good et al. | |
| 6,574,294 B1 * | 6/2003 | Lynch et al. | 375/354 |
| 6,747,949 B1 * | 6/2004 | Futral | 370/231 |
| 7,007,097 B1 * | 2/2006 | Huffman et al. | 709/232 |
| 2002/0150049 A1 | 10/2002 | Collier | |
| 2003/0223369 A1 | 12/2003 | Anderson | |

* cited by examiner

Primary Examiner — Idriss N Alrobaye
Assistant Examiner — Richard B Franklin
(74) Attorney, Agent, or Firm — Blakely, Sokoloff, Taylor & Zafman LLP

(57) ABSTRACT

An apparatus and method for maximizing buffer utilization in an I/O controller using credit management logic contained within the I/O controller. The credit management logic keeps track of the number of memory credits available in the I/O controller and communicates to a chipset connected to the I/O controller the amount of available memory credits. The chipset may then send an amount of data to the I/O controller equivalent to or less than the communicated available amount of memory credits to reduce the occurrence of a "retry" event. The amount of available memory credits is determined by comparing the available memory in each buffer within the I/O controller and designating that the "available" amount of memory for the I/O controller is an amount equivalent to the amount of memory contained in the buffer with the least amount of available memory. This "available" amount of I/O controller memory may then be converted into memory credits and communicated to the chipset.

19 Claims, 4 Drawing Sheets

APPARATUS AND METHOD TO MAXIMIZE BUFFER UTILIZATION IN AN I/O CONTROLLER

CROSS-REFERENCE TO RELATED APPLICATIONS

The present patent application is a Divisional of application Ser. No. 12/113,035, filed Apr. 30, 2008, which is a Continuation of application Ser. No. 10/815,347, filed Mar. 31, 2004.

BACKGROUND

1. Field

Computing device input/output (I/O) controllers.

2. Background

An I/O controller is the hardware that directs the flow of data between a chipset and at least one I/O bus of a computing device. Generally, data sent from the chipset to the I/O controller is temporarily stored in buffers contained within the I/O controller until an I/O bus connected to the I/O controller has space available to send the data to other places within the computing device. Computing devices operate at less than optimum efficiency since they often do not fully maximize the potential of their I/O controllers.

Some inefficiency occurs when the chipset sends data to the I/O controller but buffers within the I/O controller assigned to receive the data do not have sufficient space to accommodate the additional data they are assigned to store. In other situations, there may be sufficient collective space in the buffers, but too much data may be assigned to any one buffer and, since there is little control over where the data is going to be assigned for storage between the buffers, that particular buffer is incapable of storing the additional data being sent to it.

In each of these situations, the I/O controller sends a "retry" (e.g., all or part of the data sent is flushed from the pipeline established between the chipset and the I/O controller, requiring the chipset to send the flushed data again) to the chipset if any the buffers are incapable of temporarily storing the data assigned to them. This decreases efficiency for two reasons: 1.) the same data is sent to the I/O controller multiple times, and 2.) the additional traffic on a bus connecting the chipset and the I/O controller often requires more bandwidth than the bus can efficiently handle.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
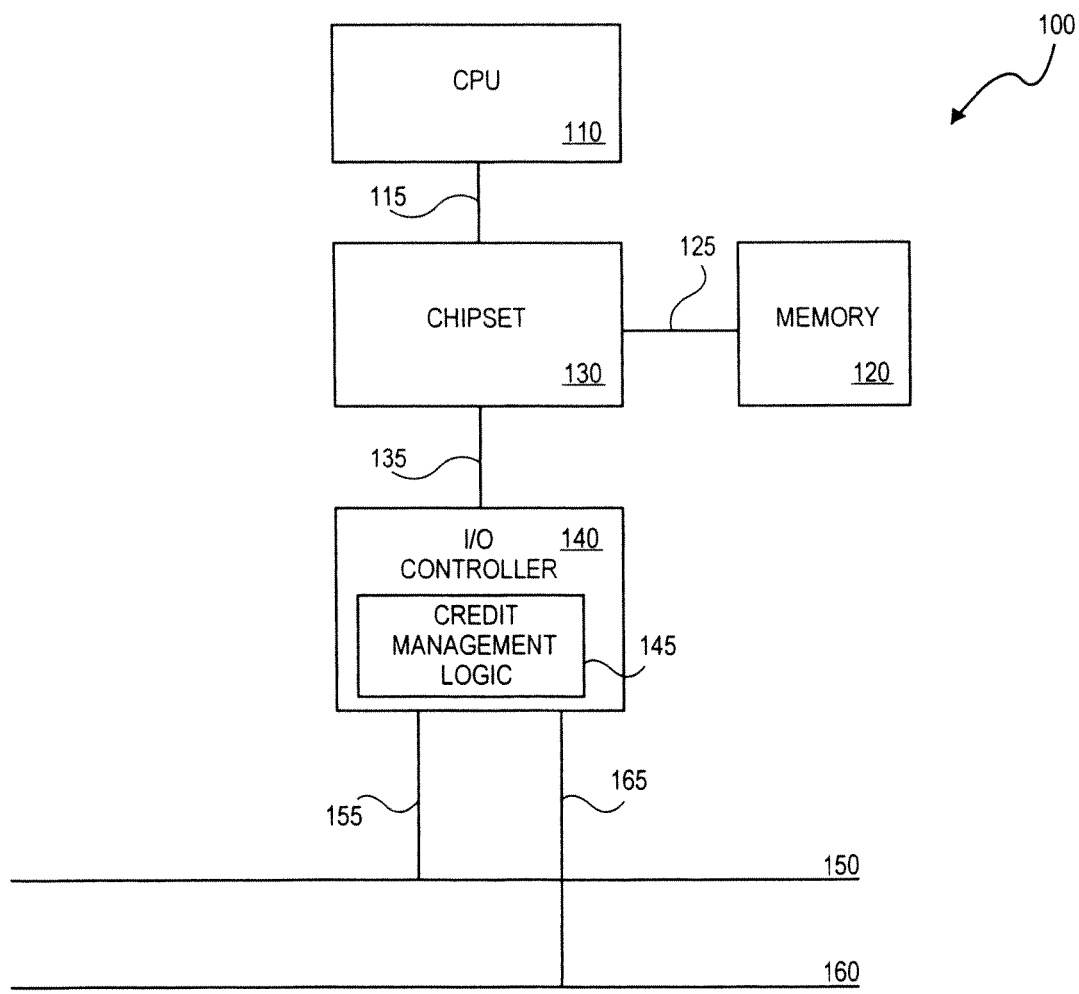
FIG. 1 shows a block diagram of one embodiment of a system for maximizing buffer utilization in an I/O controller.

FIG. 1 shows a block diagram of one embodiment of a system for maximizing I/O buffer utilization in an I/O controller. System 100, in one embodiment, includes central processing unit (CPU) 110, memory 120 and chipset 130. CPU 110, memory 120 and chipset 130 may be any processor, memory and chipset known in the art, respectively. In other embodiments, chipset 130 may be a peripheral component interconnect (PCI) link, PCI EXPRESS link or other similar memory controllers using other bus architectures. PCI EXPRESS is a technology for implementing a bus architecture known under the PCI EXPRESS trademark.

System 100, in an embodiment, includes bus 115 to connect CPU 110 to chipset 130 and establish communication there between. In addition, system 100, in one embodiment, includes bus 125 to connect memory 120 to chipset 130 and establish communication there between.

In one embodiment, system 100 also includes bus 135 to connect chipset 130 to I/O controller 140. Bus 135, in an embodiment, is a bus capable of transferring data between chipset 130 and I/O controller 140 at a rate of about four gigabytes per second. In other embodiments, bus 135 may transfer data at faster or slower rates, depending upon to needs of the particular embodiment.

In an embodiment, system 100 includes I/O buses 150, 160 connected to I/O controller 140 via buses 155, 165 respectively. I/O buses 150, 160 in one embodiment are peripheral component interconnect (PCI) buses. In other embodiments, I/O buses 150, 160 may be PCI-X buses, universal serial buses (USB), video electronics standard association (VESA) local (VL) buses, industry standard architecture (ISA) buses, ethernet, or other types of buses known in the art.

I/O controller 140 (discussed in greater detail below), in one embodiment, is an I/O controller capable of directing the flow of data between chipset 120 and I/O buses 150, 160. In other embodiments, I/O controller 140 may be a bridge, a switch, an endpoint and a root complex. In an embodiment, I/O controller 140 includes credit management logic to communicate to chipset 130 available amounts of memory (e.g., memory credits) in I/O controller 140.

In one embodiment, I/O controller 140 issues a request to gain access to bus 125 to retrieve data stored in memory 120. Once access is granted, in one embodiment, I/O controller 140 issues a request to read data contained within memory 120. In an embodiment, once the request is granted, the requested data is sent to chipset 130. Chipset 130, in one embodiment, temporarily stores the requested data until chipset 130 receives a message from I/O controller 140 indicating an amount of available memory credits in I/O controller 140, at which time chipset 130 will send the temporarily stored data to I/O controller 140.

In one embodiment, the amount of data chipset 130 sends to I/O controller 140 is either equivalent to or less than the amount of available memory credits communicated from I/O controller 140 to chipset 130. This communication between I/O controller 140 and chipset 130, in an embodiment, prevents more data than I/O controller 140 is capable of temporarily storing, from being sent to I/O controller 140 and, thus, all or a portion of the data being flushed from bus 135 and requiring chipset 130 to send the flushed data a subsequent time (e.g., a "retry").

In other embodiments, chipset 130 may wish to write data from memory 120 into I/O controller 140. In these embodiments, chipset 130 will send the data chipset 130 wants to write into I/O controller 140 when chipset 130 receives a message that I/O controller 140 has available memory similar to the embodiments discussed above.

Once the data sent from chipset 130 is stored in I/O controller 140, in one embodiment, I/O controller 140 temporarily stores the data in buffers contained within I/O controller until there is space on either I/O bus 150, 160 or both I/O buses 150, 160, to send (e.g., "empty") data onto I/O buses 150, 160. The data emptied onto I/O buses 150, 160 is then sent to other locations within the computing device.

In one embodiment, after I/O controller 140 has emptied some or all of the data temporarily stored within it, I/O controller 140 again sends a request to gain access to bus 125 and repeats the process of having data sent from memory 120 to other locations within the computing device. This process, in one embodiment, may be repeated multiple times to transfer data from memory 120 to other locations in the computing device via chipset 130, I/O controller 140 and I/O buses 150, 160.

Figure 2:
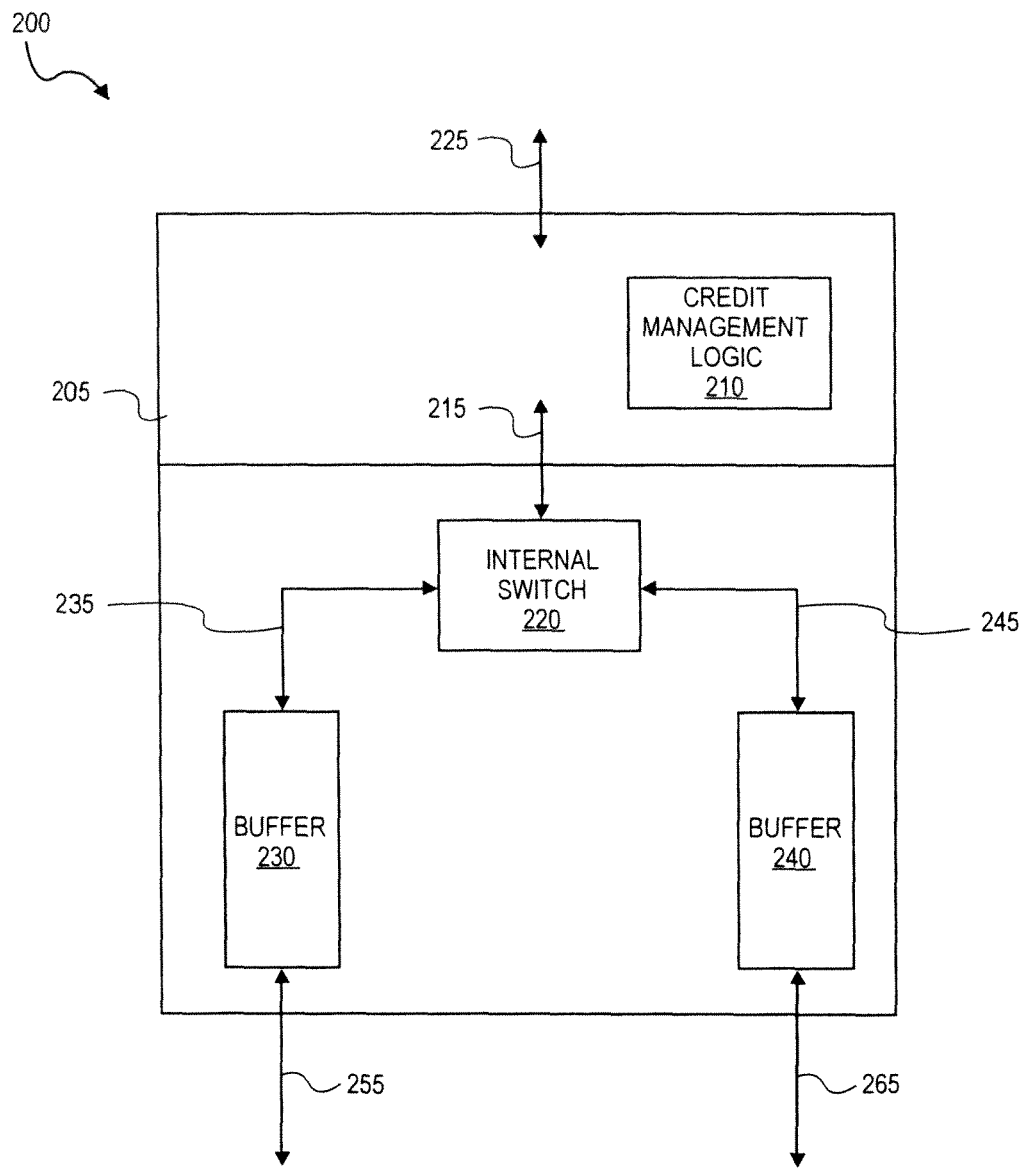
FIG. 2 shows a block diagram of one embodiment of the I/O controller shown in FIG. 1.

FIG. 2 shows a block diagram of one embodiment of the I/O controller of FIG. 1. I/O controller 200, in one embodiment, includes transaction layer 205 which contains credit management logic 210 to manage the flow of data between memory (e.g., memory 120) and I/O buses (e.g., I/O buses 150, 160) in a computing device. In one embodiment, transaction layer 205 implements PCI EXPRESS bus protocol. In other embodiments, transaction layer 205 implements PCI bus protocol, PCI-X bus protocol, industry standard architecture (ISA) bus protocol or other I/O transaction layer bus protocols for other bus architectures. PCI-X is a technology for implementing a bus architecture known under the PCI-X trademark.

Credit management logic 210 directs the flow of data between memory and the I/O buses by determining an available amount of memory credits in I/O controller 200 and keeping track of the amount of credits sent and received by I/O controller 200. In embodiments implementing PCI EXPRESS bus protocol, each credit managed by credit management logic 210 is 16 bytes of data. In other embodiments using other bus architectures, depending on the protocol used, each credit will be in the range of 1 byte to 16 bytes of data.

In one embodiment, I/O controller 200 includes internal switch 220 connected to transaction layer 205 and buffers 230, 240 via internal buses 215, 235, 245, respectively. Internal switch 220, in one embodiment, is located south of transaction layer 205. In other embodiments, internal switch 220 may be located elsewhere within I/O controller 200 provided internal switch 220 is capable of receiving data from transaction layer 205 and distributing the data to buffers 230, 240.

Buffers 230, 240 may be any type of buffers known in the art capable of temporarily storing data in an I/O controller. In one embodiment, buffers 230, 240 are each 512 byte buffers. In other embodiments, buffers 230, 240 may be buffers in the range of 64 bytes to 64 kilobytes in size. In addition, buffers 230, 240, in one embodiment, are the same size. In other embodiments, buffers 230, 240 may be different sizes.

In one embodiment, buffers 230, 240 are capable of each handling eight commands. In other embodiments, buffers 230, 240 are capable of handling from one to 16 commands each.

In the embodiment shown in FIG. 2, I/O controller 200 has two buffers. In addition, it is contemplated I/O controller 200 may contain more than two buffers. In other embodiments, I/O controller 200 may contain only one buffer.

In an embodiment, I/O controller includes buses 255, 265 connecting buffers 230, 240 to a computing device's I/O buses (e.g., buses 150, 160). When there is bandwidth available on the computing device's I/O buses, in one embodiment, data stored in buffers 230, 240 is emptied onto the I/O buses and sent to other locations within the computing device.

In one embodiment, the amount of available memory credits in I/O controller 200 is determined by how much memory is "available" in I/O controller 200. Credit management logic 210, in an embodiment, checks buffers 230, 240 to determine how much memory each buffer is utilizing. In one embodiment, credit management logic 210 subtracts the amount of memory being utilized by each buffer from the total amount of memory each buffer is capable of storing to determine how much memory is available in each buffer.

Credit management logic 210, in one embodiment, compares the available amount of memory in buffer 230 to the available amount of memory in buffer 240. In an embodiment, credit management logic 210 determines the least amount of available memory in buffers 230, 240 and assigns this value as the "available" amount of memory in I/O controller 200. Using the least amount of available memory in buffers 230, 240 as the "available" amount of memory in I/O controller 200, in one embodiment, assists in reducing the occurrence of "retries" between I/O controller 200 and the chipset (e.g., chipset 130) sending data to I/O controller 200.

Using the lesser amount of available memory in buffers 230, 240 as the "available" amount of memory in I/O controller 200 reduces the number of retries since each buffer contained within I/O controller 200 is capable of individually storing at least this amount of memory. This is important since there is relatively little control over how internal switch 220 is going to divide the data sent by the chipset between buffers 230, 240 for temporary storage and ensures that if internal switch 220 sends all of the data to one buffer, that buffer is capable of storing all of the data.

As discussed above, in situations where internal switch 220 sends more data to any one buffer greater than the buffer's current storing capacity, all or part of the data sent to I/O controller 200, in that instance, is flushed from the pipeline connecting the chipset to the I/O controller, requiring the flushed data to be sent a subsequent time (e.g., a retry). Thus, by ensuring that the chipset will only send an amount of data equivalent to or less than the least available amount of memory in buffers 230, 240, credit management logic 210 assists in reducing the number of retries since it will not matter how internal switch 220 divides the data between buffers 230, 240, or whether internal switch 220 sends all of the data to any one buffer since buffers 230, 240 are each individually capable of handling the requested amount of memory.

After determining the least amount of available memory in buffers 230, 240, in one embodiment, credit management logic 210 converts the "available" memory in I/O controller 200 into memory credits (e.g., the amount of "available" memory in I/O controller 200 divided by the number of bytes in one credit.). In one embodiment, once credit management logic 210 determines the amount of available credits in I/O controller 200, credit management logic sends a message to a chipset (e.g., chipset 130) connected to I/O controller 200 indicating an amount of available memory equal to the number of available memory credits in I/O controller 200. After the message is received by the chipset, the chipset may send data to I/O controller 200, depending on whether there is data to send.

After I/O controller 200 receives data sent from the chipset, in one embodiment, the data is sent to internal switch 220 for distribution to buffers 230, 240. Since internal switch 220 arbitrarily divides the data between buffers 230, 240, there may be additional available memory in I/O controller 200 (e.g., where the entire amount of requested data is not sent to the buffer with the least amount of available memory).

In one embodiment, after data is sent to buffers 230, 240, credit management logic 210 again checks buffers 230, 240 to determine whether they have available memory. If credit management logic 210 determines there is available memory in each of buffers 230, 240, and thus available memory credits in I/O controller 200, credit management logic 210, in one embodiment, sends a subsequent message to the chipset indicating an additional amount of available memory equal to the number of additional available memory credits in I/O controller 200.

The following example illustrates how credit management logic manages the flow of data between memory and I/O buses in a computing device. Suppose buffers 230, 240 are each one kilobyte buffers and one memory credit is equivalent to 16 bytes. In addition, suppose buffer 230 is, for example, currently storing 512 bytes of data while buffer 240 is, for example, currently storing 256 bytes of data. Credit management logic 210 would determine that buffer 230 has 512 bytes of available memory (1 kilobyte-512 bytes) and buffer 240 has 768 bytes of available memory (1 kilobyte-256 bytes). Since 512 bytes is the least amount of available memory contained within buffers 230, 240, credit management logic 210 would determine there are 512 bytes of "available" memory in I/O controller 200. After converting the "available" amount of memory to 32 credits (512 bytes/16 bytes), credit management logic 210, in an embodiment, would then send a message to the chipset connected to I/O controller 200 that there is memory available in I/O controller 200 equivalent to 32 memory credits worth of data. At this time, supposing there is 32 memory credits worth of data to send, the chipset would send 32 memory credits worth of data to I/O controller 200.

Next, after receiving the 32 memory credits worth of data from the chipset, suppose internal switch 220 sends all 32 memory credits (512 bytes) worth of data to buffer 240. Buffer 230 still has 512 bytes of available memory while buffer 240 has 256 bytes of available memory (768 bytes-512 bytes), leaving 16 credits (256 bytes/16 bytes) of "available" memory in I/O controller 200. Credit management logic 210 would determine this amount of memory after subsequently comparing buffers 230, 240 to each other and converting the "available" amount of memory in I/O controller 200 to memory credits, and communicate to the chipset the additional 16 credits worth of available memory in I/O controller 200, which the chipset would send, if the chipset had the data to send. Provided all 16 credits are not sent to buffer 240, the process of checking buffers 230, 240, determining available memory credits in I/O controller 200 and communicating any additional amounts of available memory to the chipset is repeated until no full memory credits are available (e.g., one of buffers 230, 240 becomes completely full).

As discussed above, buffers 230, 240, in embodiments, temporarily store the data received from the chipset connected to I/O controller 200. Buffers 230, 240, in one embodiment, each store the data received from the chipset until an I/O bus (e.g., I/O buses 155, 165) connected to each of buffers 230, 240, has bandwidth available to send some or all of the data stored in buffers 230, 240 to other locations within the computing device.

Once buffers 230 and/or buffer 240 sends at least some of the data they are temporarily storing to their respective buses, depending upon the dynamics of the current situation, additional amounts of memory credits may become available (e.g., situations where neither buffer 230 or buffer 240 remain completely full). In situations where amounts of memory credits become available, in one embodiment, credit management logic 210 continues to check for available memory in buffers 230, 240, determine an "available" amount of memory in I/O controller 200, convert the "available" amount of memory to memory credits and send messages to the chipset indicating the amount of available memory credits equivalent to the amount of "available" memory.

Continuing the example discussed above, suppose next, for example, that buffer 230 is full while buffer 240 is storing 768 bytes (i.e., has 256 bytes of available memory). If buffer 230 "empties" all of the data it is temporarily storing, credit management logic 210 would determine I/O controller 200 has 16 available memory credits (256 bytes/16 bytes) since this is the least amount of available memory between buffers 230, 240. Credit management logic 210 would then communicate this amount to the chipset and the chipset would send 16 credits worth of data to I/O controller 200, provided the chipset has at least this amount of data to send.

In one embodiment, I/O controller 200 continually repeats the process of checking for available memory, determining "available" memory, converting "available" memory to memory credits, communicating the available amounts of memory credits to the chipset, sending data to I/O controller 200 in amounts equal to or less than the communicated amount, temporarily storing the data in buffers 230, 240 and emptying the stored data onto an I/O bus connected to I/O controller 200 to be sent to other locations within the computing device during operation of the computing device. In addition, it is noted credit management logic 210 is capable of simultaneously keeping track of the number of memory credits made available by the distribution of data between buffers 230, 240 by internal switch 220, the number of memory credits made available by buffers 230, 240 emptying data onto their respective I/O buses, and the number of memory credits currently being sent by the chipset for distribution between buffers 230, 240.

Figure 3:
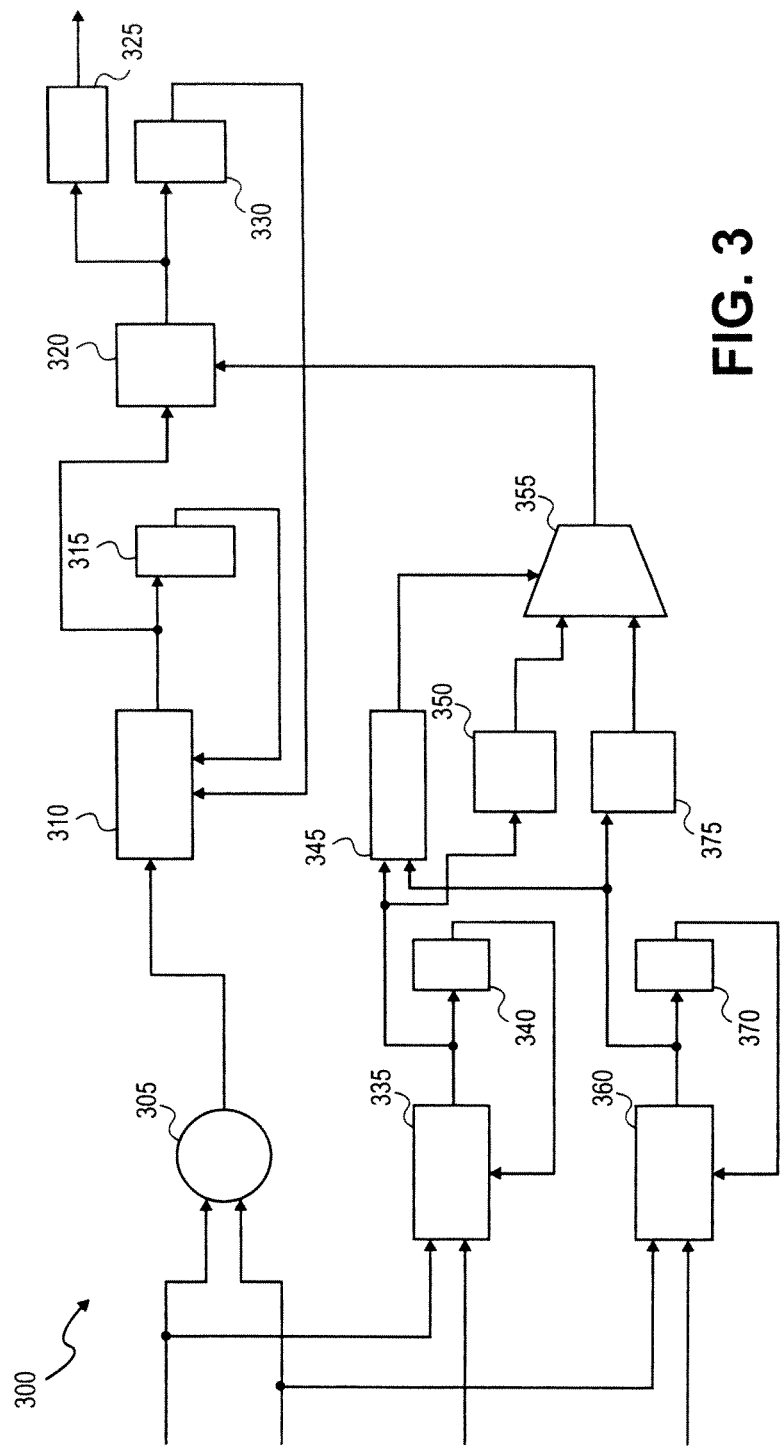
FIG. 3 shows a block diagram of an embodiment of credit management contained within the I/O controller of FIG. 2.

FIG. 3 shows a block diagram of an embodiment of credit management logic contained within the I/O controller of FIG. 2. Credit management logic 300, in one embodiment, includes adder 305 to add the amount of memory credits (credits) sent to buffers (e.g. buffers 230, 240) within an I/O controller (e.g., I/O controller 200) from a chipset (e.g., chipset 130).

An amount of credits sent to the I/O controller to be temporarily stored in buffers within the I/O controller, in an embodiment, is sent to credit available calculator circuit 310. Credit available calculator circuit 310, in one embodiment, calculates the amount of available total credits by subtracting the amount of credits sent to the buffers to the amount of available total credits, and adding the amount of return credits sent from the buffers from the amount of available total credits.

In one embodiment, the amount of available total credits calculated by credit available calculator circuit 310 is sent to credits available storage register 315 for storage. The amount of available total credits stored in credits available storage register 315, in one embodiment, is sent to credit available calculator circuit 310 for a future available total credits calculation performed by credit available calculator circuit 310.

In addition, in one embodiment, the amount of total credits calculated by credit available calculator circuit 310 is sent to credits return calculator circuit 320. Credits return calculator circuit 320, in an embodiment, calculates an amount of return credits by subtracting the amount of available total credits from an amount of available buffer credits.

In one embodiment, the amount of return credits is sent to additional available credits storage register 325 for storage. The amount of return credits, in one embodiment, is sent to the chipset. The return credits, in an embodiment, represents an additional amount of available memory in the I/O controller and, in other embodiments, the chipset sends additional data to the I/O controller in an amount equal to or less than the return credit amount communicated to the chipset.

The amount of return credits, in one embodiment, is also sent to return credit storage register 330 for storage. In an embodiment, the amount of return credits stored in return credit storage register 330 is sent to credit available calculator circuit 310 for a future available total credits calculation performed by credit available calculator circuit 310.

In one embodiment, the amount of credits sent to be temporarily stored in buffers within the I/O controller discussed above is also sent to buffer1 credit consumed calculator circuit 335, buffer2 credit calculator circuit 360, or some of the credits are sent to each of buffer1 credit consumed calculator circuit 335 and buffer2 credit consumed calculator circuit 360.

Buffer1 credit consumed calculator circuit 335, in one embodiment, calculates buffer1 consumed credits by adding an amount of the credits sent to a first buffer in the I/O controller to an amount of currently stored buffer1 credits, and subtracting credits freed (e.g., sent onto I/O buses 150, 160) from the first buffer from the amount of currently stored buffer1 credits.

The buffer1 consumed credits, in an embodiment, are sent to buffer1 consumed credit storage register 340 for storage and, in other embodiments, also sent to buffer1 consumed credits calculator circuit for a subsequent buffer1 consumed credits calculation as the amount of currently stored buffer1 credits. In addition, in one embodiment, buffer1 consumed credits are sent to buffer1 available credits storage register 350 for storage and, in other embodiments, also sent to comparator circuit 345.

In addition, some of the credits sent to the I/O controller may also be distributed to a second buffer within the I/O controller. In an embodiment, the credits sent to buffer2 credit consumed calculator circuit 360 are calculated in a similar, respective, manner as the credits sent to buffer1 credit consumed calculator circuit 335 to calculate an amount of buffer2 consumed credits. Also, in one embodiment, the buffer2 consumed credits are sent to buffer2 available credits storage register 375 for storage and, in other embodiments, also sent to comparator circuit 345 in a manner similar to the buffer1 available credits.

In one embodiment, comparator 345 compares the amount of credits in buffer1 consumed credits to the amount of credits in buffer2 consumed credits to determine a least amount of credits. After determining the least amount of credits, in one embodiment, comparator 345 sends a select signal to multiplexer 355 to choose either buffer1 available credits storage register 350 or buffer2 available credits storage register 375 based on which buffer available credits storage register has the least amount of credits as determined by the comparison of buffer1 consumed credits to buffer2 consumed credits. In one embodiment, multiplexer 355 sends the chosen register's buffer consumed credits to credits return calculator circuit 320 as the available buffer credits discussed above.

It is noted that the adder, comparator, multiplexer and each of the calculator circuits and registers may be devices and/or circuits known in the art, respectively. In addition, the I/O controller's credit management logic may also be performed by software implementations.

Figure 4:
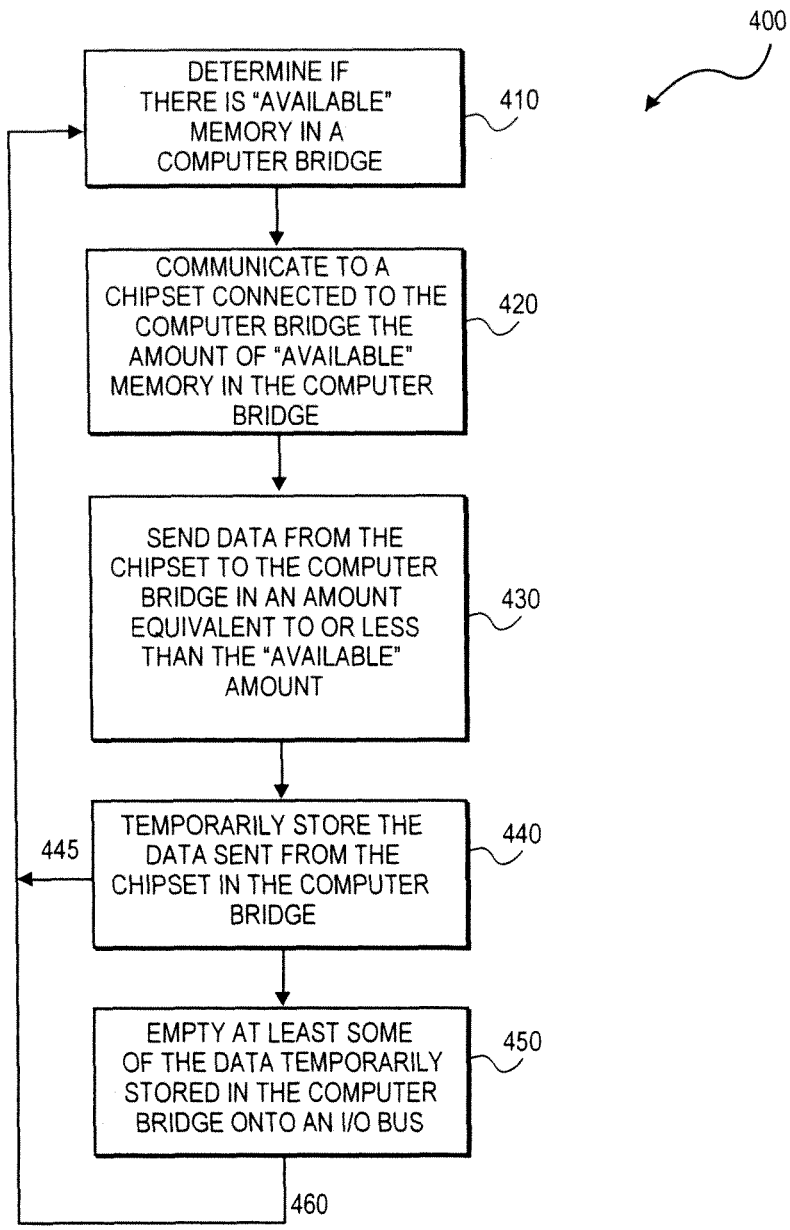
FIG. 4 shows a flow diagram of one embodiment of a method for maximizing buffer utilization in an I/O controller.

FIG. 4 shows a flow diagram of one embodiment of a method for maximizing buffer utilization in an I/O controller. Method 400 begins by determining if there are available memory credits in an I/O controller (block 410).

In one embodiment, available memory credits in the I/O controller are determined using credit management logic contained within the I/O controller to determine a least amount of available memory in buffers contained within the I/O controller, and converts this amount of memory into "available" memory similar to embodiments discussed above. The "available" memory, in one embodiment, is then converted to available memory credits similar to embodiments discussed above.

After the credit management logic determines there is an available amount of credits in the I/O controller, the I/O controller, in one embodiment, communicates to a chipset connected to the I/O controller the amount of available memory credits (block 420). In other embodiments, the credit management logic does not convert the available amount of memory into credits, but instead, keeps track of the "available" amount memory in the I/O controller.

When the chipset has been informed of the amount of available memory credits in the I/O controller, the chipset, in an embodiment, sends data in an amount equivalent to or less than the available credit amount to the I/O controller (block 430). In one embodiment, when the I/O controller receives the data sent by the chipset, the I/O controller temporarily stores the data (block 440). In an embodiment, the data received by the I/O controller is divided by an internal switch and sent to buffers contained within the I/O controller similar to embodiments discussed above.

In one embodiment, after the data is sent to the I/O controller for temporary storage in buffers, the buffers are checked (block 445) to determine if there are additional available credits in the I/O controller (block 410) (e.g., the internal switch did not distribute the entire requested amount to the buffer with the least amount of memory). When there is sufficient bandwidth available on at least one I/O bus connected to the I/O controller, in one embodiment, some or all of the data being temporarily stored in the I/O controller buffers is emptied onto at least one I/O bus (block 450).

As data is emptied from the I/O controller onto an I/O bus, the I/O controller may gain "available" credits provided one of the storage mediums (e.g., buffer) within the I/O controller does not remain full. In one embodiment, once data has been emptied onto an I/O bus, the I/O controller is checked (block 460) to determine if there are "available" credits in the computer bus (block 410).

Method 400, in one embodiment, may repeat blocks 410 through 460 multiple times during the operation of a computing device implementing method 400. In addition, in one embodiment, the credit management logic continually manages the increase and decrease of available memory credits by keeping track of the number of memory credits being made available by emptying data stored in the I/O controller buses onto their respective I/O buses and the distribution of data between the I/O controller buffers, as well as the number of available memory credits decreased by data being sent to the I/O controller from the chipset.

The system to maximize buffer utilization in an I/O controller may be implemented in software, for example, in a simulator, emulator or similar software. A software implementation may include a microcode implementation. A software implementation may be stored on a machine readable medium. A "machine readable" medium may include any medium capable of storing information. Examples of a machine readable medium include, but are not limited to, a ROM, a floppy disk, a CD-ROM, an optical disk, a hard disk, and similar media and mediums.

In the preceding paragraphs, specific embodiments are described. It will, however, be evident that various modifications and changes may be made thereto without departing from the broader spirit and scope of the claims. The specification and drawings are, accordingly, to be regarded in an illustrative rather than a restrictive sense.

The invention claimed is:

1. A method comprising:
   determining an amount of available memory credits in an input/output (I/O) controller;
   communicating to a chipset within a device coupled to the I/O controller within the device the amount of available memory credits, the amount of available memory credits being a specific number of available memory credits; and
   sending an amount of data from the chipset to the I/O controller, the amount of data sent being one of equivalent to or less than the communicated available memory credit amount.

2. The method of claim 1, wherein determining the available amount of memory credits comprises:
   determining a least amount of available memory in one of a plurality of buffers to create an amount of available memory in an I/O controller.

3. The method of claim 2, further comprising:
   converting the amount of available memory in the I/O controller to the amount of available memory credits.

4. The method of claim 3, wherein converting the amount of available memory to an amount of available memory credits comprises:
   dividing the available amount of memory in the I/O controller by an amount of memory equivalent to one credit.

5. The method of claim 2, further comprising:
   temporarily storing the data sent from the chipset in the I/O controller.

6. The method of claim 5, wherein temporarily storing the data comprises:
   temporarily storing the data in at least one buffer contained within the I/O controller.

7. The method of claim 6, wherein temporarily storing the data in at least one buffer comprises:
   storing the data in a plurality of buffers.

8. The method of claim 6, further comprising:
   emptying the buffer of at least some of the data temporarily stored in the I/O controller to create a new amount of available memory credits in the I/O controller.

9. The method of claim 8, wherein emptying at least some of the data comprises:
   sending the data to at least one I/O bus coupled to the I/O controller.

10. The method of claim 9, wherein sending the data to at least one I/O bus comprises:
    sending the data to a plurality of I/O buses coupled to the I/O controller.

11. The method of claim 8, further comprising:
    keeping track of the number of available memory credits in the I/O controller.

12. The method of claim 11, wherein keeping track of the number of memory credits comprises:
    simultaneously keeping track of amounts of memory credits the I/O controller empties onto the I/O bus, amounts of memory credits sent to an I/O controller and amounts of memory credits made available by distribution of data sent from the chipset to a plurality of buffers contained within the I/O controller.

13. The method of claim 1, wherein the chipset directs data flow between a memory device and the I/O controller, and
    wherein the chipset communicates with the I/O controller over a bus within the device.

14. The method of claim 13, wherein the I/O controller directs data flow between the chipset and a set of I/O buses.

15. A non-transitory machine readable medium having instructions stored therein which when executed cause a machine to perform a set of operations comprising:
    determining an amount of available memory credits in an input/output (I/O) controller;
    communicating to a chipset within a device coupled to the I/O controller within the device the amount of available memory credits, the amount of available memory credits being a specific number of available memory credits; and
    sending an amount of data from the chipset to the I/O controller, the amount of data sent being one of equivalent to or less than the communicated available memory credit amount.

16. The non-transitory machine readable medium of claim 15, wherein determining the available amount of memory credits comprises:
    determining a least amount of available memory in one of a plurality of buffers to create an amount of available memory in a I/O controller.

17. The non-transitory machine read medium of claim 16, having further instructions stored therein which when executed cause a machine to perform a set of operations further comprising:
    temporarily storing the data in at least one buffer contained within the I/O controller;
        emptying the buffer of at least some of the data temporarily stored in the I/O controller onto an I/O bus coupled to the I/O controller to create a new amount of available memory credits in the I/O controller; and
        simultaneously tracking amounts of memory credits the I/O controller empties onto the I/O bus, amounts of memory credits sent to the I/O controller from the chipset and amounts of memory credits made available by distribution of the data sent from the chipset to a plurality of buffers contained within the I/O controller.

18. The non-transitory machine readable medium of claim 15, wherein the chipset directs data flow between a memory device and the I/O controller, and
    wherein the chipset communicates with the I/O controller over a bus within the device.

19. The non-transitory machine readable medium of claim 18, wherein the I/O controller directs data flow between the chipset and a set of I/O buses.

* * * * *